(12) United States Patent
Isobe (10) Patent No.: US 10,645,278 B2
(45) Date of Patent: May 5, 2020

(54) IMAGING CONTROL APPARATUS AND CONTROL METHOD THEREFOR

(71) Applicant: CANON KABUSHIKI KAISHA, Tokyo (JP)

(72) Inventor: Shingo Isobe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/018,514

(22) Filed: Jun. 26, 2018

(65) Prior Publication Data

US 2019/0007609 A1   Jan. 3, 2019

(30) Foreign Application Priority Data

Jun. 29, 2017 (JP) .................. 2017-127166

(51) Int. Cl.
*H04N 5/232* (2006.01)
*H04N 5/235* (2006.01)
(Continued)

(52) U.S. Cl.
CPC ....... *H04N 5/23232* (2013.01); *G06F 3/0488* (2013.01); *G06F 3/04815* (2013.01);
(Continued)

(58) Field of Classification Search
CPC ....... G06F 2203/04806; G06F 3/04815; G06F 3/0488; G06T 19/006; G06T 2210/41;
(Continued)

(56) References Cited

U.S. PATENT DOCUMENTS 6,084,598 A * 7/2000 Chekerylla ............. G06T 11/60
345/427
7,353,086 B2 * 4/2008 Ennis ...................... B60R 1/00
340/937
(Continued)

FOREIGN PATENT DOCUMENTS

CN   106791377 A   5/2017
JP   2014-222825 A   11/2014

OTHER PUBLICATIONS

The above foreign document was cited in a British Search Report dated Dec. 7, 2018, which is enclosed, that issued in the corresponding U.K. Patent Application No. GB1810400.0.

*Primary Examiner* — Chiawei Chen
(74) *Attorney, Agent, or Firm* — Cowan, Liebowitz & Latman, P.C.

(57) ABSTRACT

An imaging control apparatus includes: a control unit configured to receive a first user operation and configured to: when the first user operation is not received, execute control to output an image signal which is to be displayed on a display unit, the image signal being one of: a first image corresponding to a first range of a live VR image; and a second image corresponding to a second range of the live VR image, and when the first user operation is received: execute control to output an image signal which is to change the image displayed on the display unit from one of the first image and the second image to the other of the first image and the second image, or to both the first image and the second image; and issue a preparation instruction to execute imaging preparation processing.

24 Claims, 7 Drawing Sheets

(51) Int. Cl.
  *H04N 5/225* (2006.01)
  *G06F 3/0481* (2013.01)
  *H04N 5/262* (2006.01)
  *G06F 3/0488* (2013.01)
  *G06T 19/00* (2011.01)

(52) U.S. Cl.
  CPC ......... *G06T 19/006* (2013.01); *H04N 5/2258* (2013.01); *H04N 5/2352* (2013.01); *H04N 5/23238* (2013.01); *H04N 5/23293* (2013.01); *H04N 5/232945* (2018.08); *H04N 5/2628* (2013.01); *G06F 2203/04806* (2013.01)

(58) Field of Classification Search
  CPC ............ G06T 2219/028; H04N 5/2258; H04N 5/23232; H04N 5/23238; H04N 5/23293; H04N 5/232945; H04N 5/2352; H04N 5/2628; H04N 19/597; H04N 13/344; G09G 2340/045; G09G 2340/12; G02B 27/017; G02B 27/2228; G02B 27/0172; G02B 27/0176; G02B 2027/011; G02B 2027/0129; G02B 2027/013
  See application file for complete search history.

(56) References Cited

U.S. PATENT DOCUMENTS

| | | | | |
|---|---|---|---|---|
| 10,222,619 B2* | 3/2019 | Yu | ................ | A61B 90/37 |
| 10,331,208 B2* | 6/2019 | Kim | ................ | G02B 27/0093 |
| 10,354,360 B2* | 7/2019 | Sakamoto | ................ | G06T 19/00 |
| 2005/0019082 A1* | 1/2005 | Silverbrook | ................ | B41J 2/01 |
| | | | | 400/693 |
| 2006/0126439 A1* | 6/2006 | Kent | ................ | G04G 9/02 |
| | | | | 368/82 |
| 2006/0150099 A1* | 7/2006 | Laff | ................ | G06F 3/0481 |
| | | | | 715/708 |
| 2006/0164220 A1* | 7/2006 | Harter, Jr. | ................ | B60R 1/00 |
| | | | | 340/435 |
| 2010/0020221 A1 | 1/2010 | Tupman et al. | | |
| 2011/0166782 A1* | 7/2011 | Watanabe | ................ | B60R 1/00 |
| | | | | 701/532 |
| 2012/0214590 A1* | 8/2012 | Newhouse | ................ | G06F 3/011 |
| | | | | 463/31 |
| 2013/0010084 A1* | 1/2013 | Hatano | ................ | G03B 35/08 |
| | | | | 348/47 |
| 2015/0084951 A1* | 3/2015 | Boivin | ................ | H04N 13/275 |
| | | | | 345/419 |
| 2016/0148431 A1* | 5/2016 | Seydoux | ................ | G06T 19/006 |
| | | | | 345/633 |
| 2017/0151484 A1* | 6/2017 | Reilly | ................ | G06F 3/04815 |
| 2017/0192236 A1* | 7/2017 | Chen | ................ | G02B 27/0172 |
| 2017/0318235 A1* | 11/2017 | Schneider | ................ | G02B 27/2228 |
| 2017/0325907 A1* | 11/2017 | Maeda | ................ | G06F 3/01 |
| 2017/0358247 A1* | 12/2017 | Siminou | ................ | H04N 5/2252 |
| 2018/0032997 A1* | 2/2018 | Gordon | ................ | G06Q 20/3224 |
| 2018/0181196 A1* | 6/2018 | Lee | ................ | H04N 5/23296 |
| 2019/0262700 A1* | 8/2019 | Nakamura | ................ | A63F 13/2145 |
| 2019/0289284 A1* | 9/2019 | Smith | ................ | H04N 13/243 |

* cited by examiner

IMAGING CONTROL APPARATUS AND CONTROL METHOD THEREFOR

BACKGROUND OF THE INVENTION

Field of the Invention

The present invention relates to an imaging control apparatus, a control method for an electronic device, a program, and a storage medium, and more particularly to a control method for displaying an image having a wide video range.

Description of the Related Art

In recent years, cameras having a front-rear pair of integral wide-angle lenses such as fish-eye lenses so as to be capable of omnidirectional imaging, as well as virtual reality (VR) content created on the basis of images captured by these cameras, have become widespread. Camera modules that have wide angle lenses and can be connected to an expansion connector of a smartphone are also available, and by using the camera module in combination with an application operated on the smartphone, omnidirectional images can be captured.

To check an image during or after imaging by the imaging apparatuses described above, a two-dimensional display provided on the camera or the smartphone is typically used. As regards a format in which to display the image on the display, an omnidirectional image format in which the entire omnidirectional image is displayed on the display or a format in which a partial region is extracted from the omnidirectional image and displayed on the display may be used.

As the omnidirectional image format, a dome master format in which a 360-degree image is mapped onto a spherical region, an omnidirectional image format using equirectangular projection, a so-called panorama format, and so on may be used. A format (referred to hereafter as a fish-eye image format) in which two fish-eye images captured respectively by a front-rear pair of optical systems provided in a camera capable of omnidirectional imaging, as described above, are displayed as is may also be used.

In the format in which a partial region is extracted from the omnidirectional image and displayed on the display, meanwhile, a partial region extracted on the basis of a direction in which the display is held is typically displayed.

Japanese Patent Application Publication No. 2014-222825 discloses a technique for capturing a wide-angle video, preferentially extracting a region in which a moving body exists from the captured video, and converting an aspect ratio of a preferred image into a display aspect ratio. With Japanese Patent Application Publication No. 2014-222825, when an object serving as a monitoring target is a moving body, the monitoring target can be selected and photographed automatically.

SUMMARY OF THE INVENTION

However, with the format in which a partial region extracted from an omnidirectional image is displayed, it is difficult to check the overall image and a part of the image in the direction of a blind spot of the photographer. To check the overall image and the part of the image in the direction of a blind spot of the photographer, the photographer must modify a display range by orienting the camera in each of several directions or operating a touch panel, making the checking process laborious. With the format in which the entire omnidirectional image is displayed, on the other hand, it is difficult to check the image in detail, and as a result, a photo opportunity may be missed. Moreover, Japanese Patent Application Publication No. 2014-222825 does not describe region extraction in a case where the object is stationary, and yet the object is not necessarily in constant motion.

Hence, the present invention provides a technique allowing a photographer to check an image more favorably so that the photographer can execute imaging at an appropriate timing, without missing a photo opportunity.

An imaging control apparatus according to the present invention includes: a control unit configured to receive a first user operation and configured to: in a case where the first user operation is not received, execute control to output an image signal which is to be displayed on a display unit, the image signal being one of: a first image corresponding to a first range of a live virtual reality (VR) image which is a live view image received from an imaging unit; and a second image corresponding to a second range of the live VR image which is magnified relative to the live VR image, the second range being a smaller range than the first range, and in a case where the first user operation is received: execute control to output an image signal which is to change the image displayed on the display unit from one of the first image and the second image to the other of the first image and the second image, or to both the first image and the second image; and issue a preparation instruction to execute imaging preparation processing.

According to the present invention, a photographer can check an image more favorably, and as a result, the photographer can execute imaging at an appropriate timing, without missing a photo opportunity.

Further features of the present invention will become apparent from the following description of exemplary embodiments with reference to the attached drawings.

DESCRIPTION OF THE EMBODIMENTS

FIGS. 1A to 1D show the outer appearance of a camera 100 which is an example of an imaging control apparatus to which the present invention can be applied. The camera 100 is a digital camera having an integral lens. Note that the camera 100 may be a single-lens reflex camera, a mirrorless SLR camera, or the like. The present invention is applicable to various types of imaging apparatuses to which wide-angle lenses are attached.

Figure 1A:
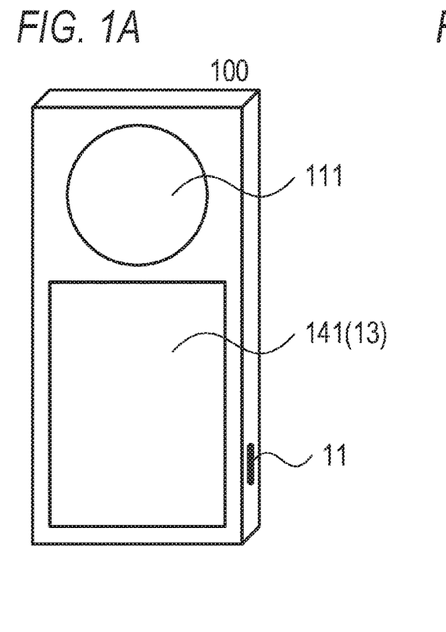
FIGS. 1A-1D are views showing the outer appearance of a camera 100.

FIG. 1A shows the outer appearance of a front face of the camera 100. A display unit 141 displays captured images and various types of information. The image displayed on the display unit 141 is switched in response to an imaging preparation instruction. A touch panel 13 provided on a display surface of the display unit 141 receives touch operations executed by a photographer. A release button 11 is a switch that can be half-pressed and fully pressed. By half-pressing the release button 11, an imaging preparation instruction is issued to the camera 100, and by fully pressing the release button 11, an imaging instruction is issued to the camera 100. A lens 111 is a wide-angle lens, and optical flux entering the lens 111 is formed into an image by an imaging device 112 (not shown in FIG. 1A).

Figure 1B:
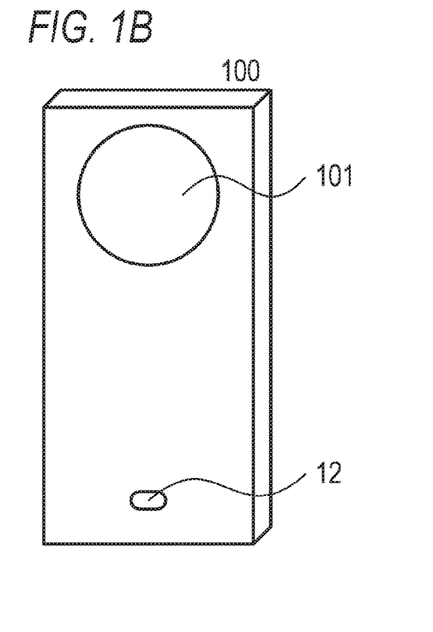

FIG. 1B shows the outer appearance of a back face of the camera 100. By pressing a button 12, an imaging preparation instruction is issued to the camera 100, and by performing an operation to remove a finger or the like pressing the button 12 from the button 12, an imaging instruction is issued to the camera 100. A lens 101 is a similar wide-angle lens to the lens 111, and optical flux entering the lens 101 is formed into an image by an imaging device 102 (not shown in FIG. 1B).

A VR image is formed by the imaging devices 102, 112. A VR image is an image that can be used in VR display. VR images include omnidirectional images picked-up by an omnidirectional camera, panorama images having a wider video range (effective video range) than a display range that can be displayed at one time by display unit, and so on. VR images include not only static images, but also moving images and live view images (images obtained from a camera substantially in real time). A VR image has a maximum video range (effective video range) corresponding to a viewing field of 360 degrees in an up-down direction (a vertical angle, an angle from the zenith, an angle of elevation, an angle of depression, an altitude) and 360 degrees in a left-right direction (a horizontal angle, an azimuth angle). Further, VR images include images which, although smaller than 360 degrees in the up-down direction or smaller than 360 degrees in the left-right direction, have a wider angle of view (viewing field range) than an angle of view that can be captured by a normal camera or a wider video range (effective video range) than a display range that can be displayed at one time by display unit. For example, an image captured by an omnidirectional camera capable of photographing an object in a viewing field range (an angle of view range) of 360 degrees in the left-right direction (the horizontal angle, the azimuth angle) and 210 degrees in terms of a vertical angle centering on the zenith is a type of VR image. Further, for example, an image captured by a camera capable of photographing an object in a viewing field range (an angle of view range) of 180 degrees in the left-right direction (the horizontal angle, the azimuth angle) and 180 degrees in terms of a vertical angle centering on the zenith is a type of VR image. In other words, images having a video range corresponding to a viewing field of at least 160 degrees (±80 degrees) in both the up-down direction and the left-right direction and a wider video range than a range that can be seen by a human being at one time are types of VR images. When a VR image is used in VR display, a seamless, omnidirectional video can be viewed in the left-right direction (a horizontal rotation direction) by varying the attitude of the display unit in a left-right rotation direction. In the up-down direction (a vertical rotation direction), a seamless, omnidirectional video can be viewed within a range of ±105 degrees when seen from directly above (the zenith), but a range exceeding 105 degrees from directly above is a blank region in which no video exists. A VR image may also be referred to as "an image having a video range that forms at least a part of a virtual space (VR space)".

VR display is a display method with which a display range of a VR image can be modified so that a video having a viewing field range corresponding to the attitude of the display unit is displayed. In a case where a user views a video while wearing a head-mounted display (HMD) which is the display unit, a video having a viewing field range corresponding to the orientation of the face of the user is displayed. For example, at a certain point, a video of a part of the VR image having a viewing field angle (an angle of view) centering on 0 degrees in the left-right direction (a specific bearing, for example north) and 90 degrees in the up-down direction (90 degrees from the zenith, i.e. horizontal) is displayed. When the attitude of the display unit is inverted from this condition (for example, when the display surface is modified from a southward orientation to a northward orientation), the display range is modified to a video of a part of the same VR image having an angle of view centering on 180 degrees in the left-right direction (an opposite bearing, for example south) and 90 degrees in the up-down direction (horizontal). Hence, when the user moves his/her face from a northward orientation to a southward orientation (in other words, looks back) while watching the HMD, the video displayed on the HMD likewise changes from a video of the north to a video of the south. With VR display, the user can be provided with a visual sensation of being in the location of the VR image (the VR space). A smartphone mounted on VR goggles (a head-mounted adapter) may be considered a type of HMD. The display range may be moved (scrolled) not only by attitude variation, but also in response to a user operation performed on a touch panel, a direction button, or the like.

Figure 1C:
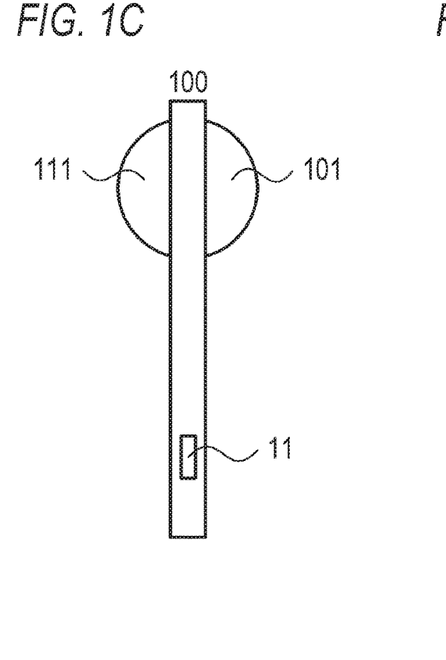

FIG. 1C shows the outer appearance of a side face of the camera 100. The lens 101 and the lens 111 are disposed in a pair on the front and rear of the camera 100, and the respective angles of view of the lens 101 and the lens 111 are 180 degrees. In other words, a 360-degree angle of view is satisfied by the lens 101 and the lens 111. Accordingly, images corresponding to 180-degree angles of view are picked-up respectively by the imaging device 102 and the imaging device 112. A VR image corresponding to a 360-degree angle of view is formed by the two images picked-up by the two imaging devices 102, 112.

Figure 1D:
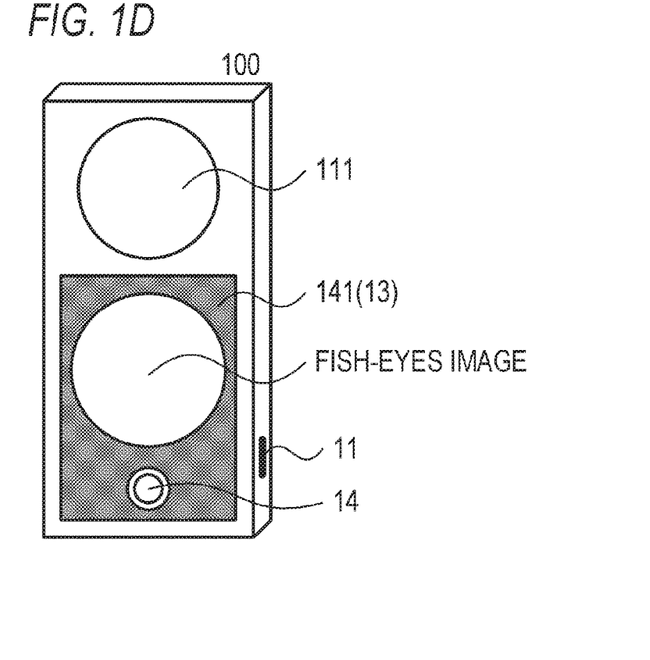

FIG. 1D shows an example of a screen displayed on the display unit 141. Here, a fish-eye image picked-up by the imaging device 102 or the imaging device 112 is displayed. A touch panel button 14 is also displayed. The touch panel button 14 is an item used to issue an imaging preparation instruction and an imaging instruction. More specifically, the touch panel button 14 is configured such that an imaging preparation instruction is issued to the camera 100 by performing a touch operation to touch a position on the touch panel 13 corresponding to the touch panel button 14. An imaging instruction is then issued to the camera 100 by performing an operation to release a finger or a pen touching the touch panel button 14 from the touch panel button 14 (the touch panel 13). Further, by performing a touch operation to touch a position within the displayed fish-eye image, or more specifically a position on the touch panel corresponding to this position, a display range selection instruction is issued while issuing an imaging preparation instruction.

Note that the display unit 141 may be a separate apparatus to the camera 100. For example, the display unit 141 may be provided on a smartphone or the like provided separately to the camera 100. Further, the user operations for issuing an imaging preparation instruction and an imaging instruction may be performed on a separate apparatus to the camera 100. For example, the user operations may be performed on a smartphone provided separately to the camera 100, and the smartphone may issue the instructions corresponding to the user operations to the camera 100.

Figure 2:
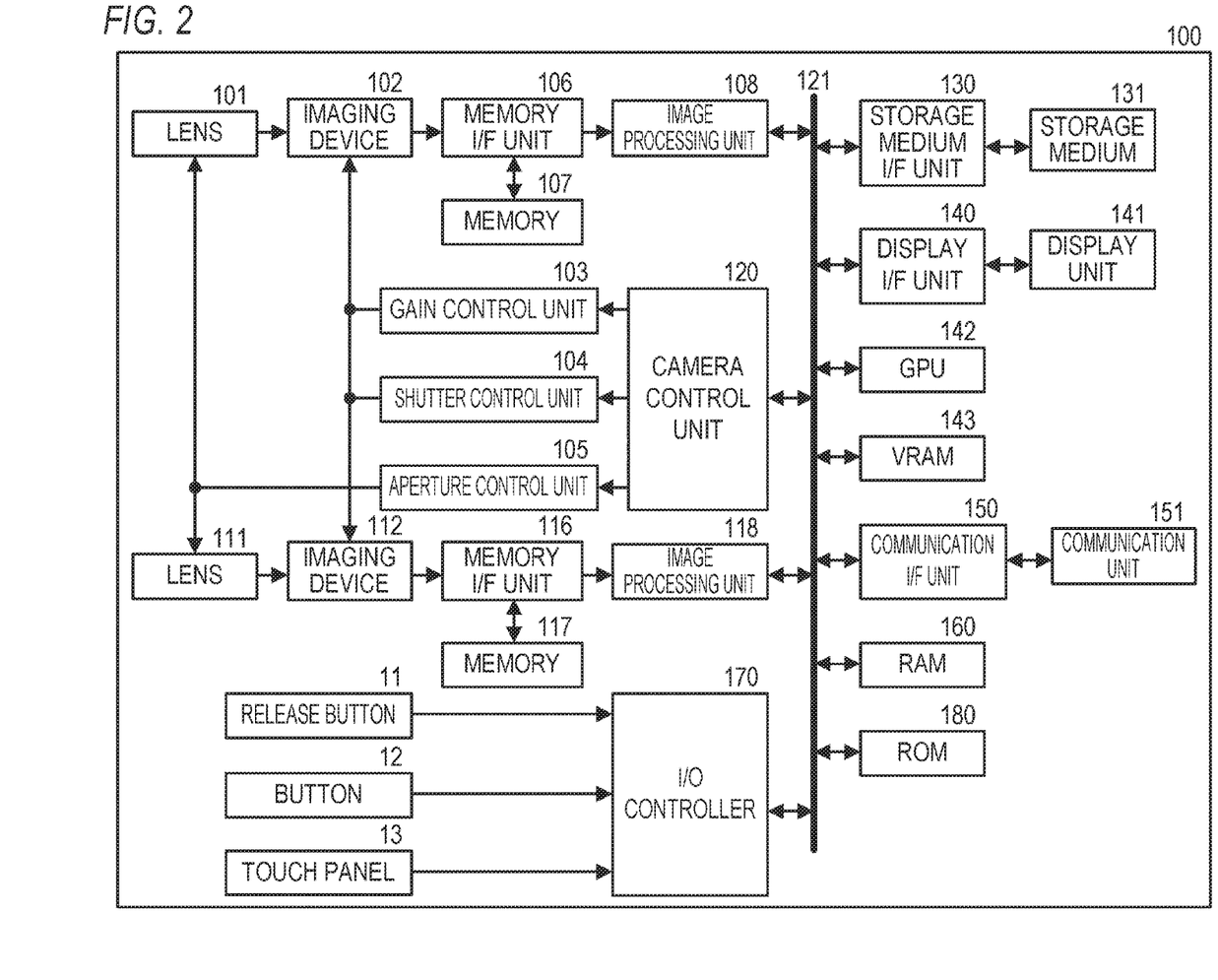
FIG. 2 is a view showing an internal configuration of the camera 100.

FIG. 2 shows an internal configuration of the camera 100. Note that although FIG. 2 shows respective functions as separate constituent elements, the respective functions may be realized by one or a plurality of pieces of hardware such as an ASIC or a programmable logic array (PLA). The respective functions may also be realized by having a programmable processor such as a CPU or an MPU execute software.

The lens 101 is a single focus lens having an aperture mechanism, and deep focus is used as a focal position of the lens 101.

The imaging device 102 is constituted by a two-dimensional array of a plurality of pixels including photoelectric conversion elements. The imaging device 102 generates an analog signal by subjecting an object image (an optical image) formed by an imaging optical system including the lens 101 to photoelectric conversion, or in other words imaging, in each pixel, converts the analog signal into a digital signal using an A/D conversion circuit, and outputs pixel-unit RAW image data.

A memory I/F unit 106 writes the RAW image data for all of the pixels, output from the imaging device 102, to a memory 107. Further, the memory I/F unit 106 reads the RAW image data held in the memory 107 and outputs the read data to an image processing unit 108. The memory 107 is a volatile storage medium for storing all-pixel RAW image data corresponding to several frames.

The image processing unit 108 implements processing such as gamma correction, color separation, and color difference matrixing on the all-pixel RAW image data from the memory I/F unit 106, adds a synchronization signal thereto, and outputs video data for recording or display. Further, the image processing unit 108 obtains a photometry value from a luminance value of each pixel in the RAW image data input into the image processing unit 108, and provides the photometry values to a camera control unit 120 via a bus 121.

The lens 111, the imaging device 112, a memory I/F unit 116, a memory 117, and an image processing unit 118 have similar functions to the lens 101, the imaging device 102, the memory I/F unit 106, the memory 107, and the image processing unit 108. The lens 111, the imaging device 112, the memory/F unit 116, the memory 117, and the image processing unit 118 respectively execute similar processing to the lens 101, the imaging device 102, the memory I/F unit 106, the memory 107, and the image processing unit 108.

The camera control unit 120 is constituted by a CPU and so on, and controls an overall operation of the camera 100. A RAM 160 is used as a working area (a work memory) of the camera control unit 120. Constants and variables used to operate the camera control unit 120 are recorded in the RAM 160, and programs and so on are expanded thereon. A ROM 180 stores a computer program and so on for operating the camera control unit 120. For example, the camera control unit 120 controls the overall operation of the camera 100 by expanding and executing the computer program stored in the ROM 180 on the RAM 160.

A gain control unit 103, a shutter control unit 104, and an aperture control unit 105 are used in exposure control. The camera control unit 120 controls these control units 103 to 105 on the basis of the photometry values provided by the image processing unit 108 and the image processing unit 118, or operating parameters set manually by the user. The gain control unit 103 controls respective gains of the imaging device 102 and the imaging device 112. The shutter control unit 104 controls respective shutter speeds of the imaging device 102 and the imaging device 112. The aperture control unit 105 controls the aperture mechanism of the lens 101 and the aperture mechanism of the lens 111.

A storage medium I/F unit 130 is an interface for connecting a storage medium 131 to the camera 100. The storage medium IF unit 130 records video data input therein from the image processing unit 108, the image processing unit 118, and a GPU 142 in the storage medium 131, and reads the recorded video data from the storage medium 131. The storage medium 131 is constituted by a semiconductor memory or the like.

A display L/F unit 140 outputs the video data from the image processing unit 108 and the image processing unit 118 and image data rendered in a video RAM (VRAM) 143 by the GPU 142 to a display unit 141. Images displayed on the display unit 141 are mainly used to check images captured by a photographer.

The GPU 142 is a rendering engine for executing image conversion processing, image extraction processing, magnification processing, distortion correction, and the like on the video data output from the image processing unit 108 and the image processing unit 118 on the basis of an instruction from the camera control unit 120 in order to render the video data in the VRAM 143. The GPU 142 also executes processing for rendering, in a superimposed fashion, various types of displayed information relating to the camera 100 and a menu screen in the VRAM 143. The touch panel button 14 described above is rendered by the GPU 142 as a graphic user interface (GUI) and displayed on the display unit 141 via the display IF unit 140.

A communication I/F unit 150 connects to a smartphone, a PC, or the like, not shown in the figure, on the exterior of the camera 100 via a communication unit 151 in order to transfer the image data displayed by the display unit 141 thereto. Further, the communication I/F unit 150 receives control commands and the like issued in the relation to the camera 100 by the smartphone, the PC, or the like, and notifies the camera control unit 120 thereof. The communication unit 151 is a wireless LAN interface that performs wireless communication, and executes hardware processing in relation to the communication performed by the communication IF unit 150.

The release button 11, the button 12, and the touch panel 13 have the functions described above, and output operation information (an imaging preparation instruction, an imaging instruction, a display range selection instruction, and so on) corresponding to an operation to an IO controller 170. The IO controller 170 outputs the operation information from the respective operation units to the camera control unit 120, and the camera control unit 120 executes processing corresponding to the operation information from the IO controller 170. For example, the touch panel 13 is laminated onto the display unit 141 in order to output operation information including coordinate information indicating a position or region of a touch operation and so on.

Figure 3:
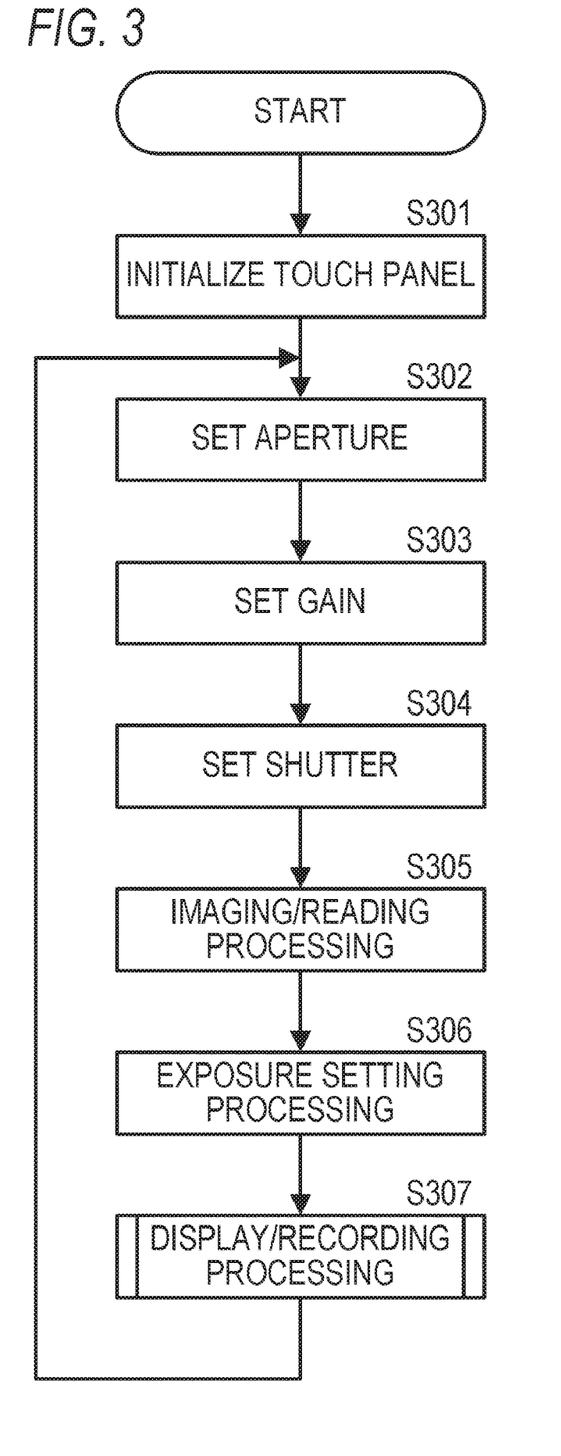
FIG. 3 is a flowchart executed by a camera control unit 120.

FIG. 3 is a flowchart showing overall processing executed by the camera 100. The processing on the flowchart is realized by the camera control unit 120 by expanding and executing the program recorded in the ROM 180 on the RAM 160. The flowchart shown in FIG. 3 is started when a power supply is introduced into the camera 100, for example, and processing from S302 to S307 is executed repeatedly at a predetermined frame rate (in predetermined periods).

In S301, the camera control unit 120 executes coordinate calibration on the display unit 141 and the touch panel 13 (touch panel initialization). In so doing, coordinates on the touch panel 13 and coordinates on an image displayed on the display unit 141 can be inter-converted, and as a result, touch operations performed on the touch panel button 14, touch operations performed on a captured image, and so on can be detected.

In S302, the camera control unit 120 sets an aperture value in the aperture control unit 105 (aperture setting). In a first aperture setting operation, the camera control unit 120 sets an open aperture value in the aperture control unit 105 as an initial value of the aperture value. From a second aperture setting operation onward, the camera control unit 120 sets an aperture value determined during exposure setting processing of S306 in the aperture control unit 105.

In S303, the camera control unit 120 sets a gain in the gain control unit 103 (gain setting). In a first gain setting operation, the camera control unit 120 sets 0 dB in the gain control unit 103 as an initial value of the gain. From a second gain setting operation onward, the camera control unit 120 sets a gain determined during the exposure setting processing of S306 in the gain control unit 103.

In S304, the camera control unit 120 sets a shutter speed in the shutter control unit 104 (shutter setting). In a first shutter setting operation, the camera control unit 120 sets 1/60 of a second in the shutter control unit 104 as an initial value of the shutter speed. From a second shutter setting operation onward, the camera control unit 120 sets a shutter speed determined during the exposure setting processing of S306 in the shutter control unit 104.

In S305, the camera control unit 120 executes imaging/reading processing for the purpose of live view imaging. More specifically, the aperture control unit 105 executes processing for controlling the respective aperture mechanisms of the lenses 101, 111 on the basis of the aperture value set in S302 in response to an instruction from the camera control unit 120. The gain control unit 103 executes processing for controlling the respective gains of the imaging devices 102, 112 on the basis of the gain set in S303 in response to an instruction from the camera control unit 120. The shutter control unit 104 executes processing for controlling the respective shutter speeds of the imaging devices 102, 112 on the basis of the shutter speed set in S304 in response to an instruction from the camera control unit 120. The imaging devices 102, 112 then execute imaging based on the values set in S302 to S304 in response to an instruction from the camera control unit 120. Next, the memory I/F unit 106 executes processing for recording an image (a RAW image) picked-up by the imaging device 102 in the memory 107 and outputting the image to the image processing unit 108 in response to an instruction from the camera control unit 120. Similarly, the memory I/F unit 116 executes processing for recording an image (a RAW image) picked-up by the imaging device 112 in the memory 117 and outputting the image to the image processing unit 118 in response to an instruction from the camera control unit 120.

In S306, the camera control unit 120 determines whether or not the exposure of the images picked-up in S305 is appropriate, and determines exposure values (the aperture value, the gain, and the shutter speed) for the next imaging operation (exposure setting processing). More specifically, the camera control unit 120 obtains photometry values acquired on the basis of the images picked-up in S305 from the image processing units 108, 118, and calculates an exposure evaluation value on the basis of the obtained photometry values. The camera control unit 120 then compares the calculated exposure evaluation value with an exposure target value determined in advance, and determines whether or not the exposure of the picked-up images is appropriate. When the exposure is not appropriate, the camera control unit 120 determines the exposure values of the next imaging operation so that images closer to an optimum exposure are picked-up.

Figure 4:
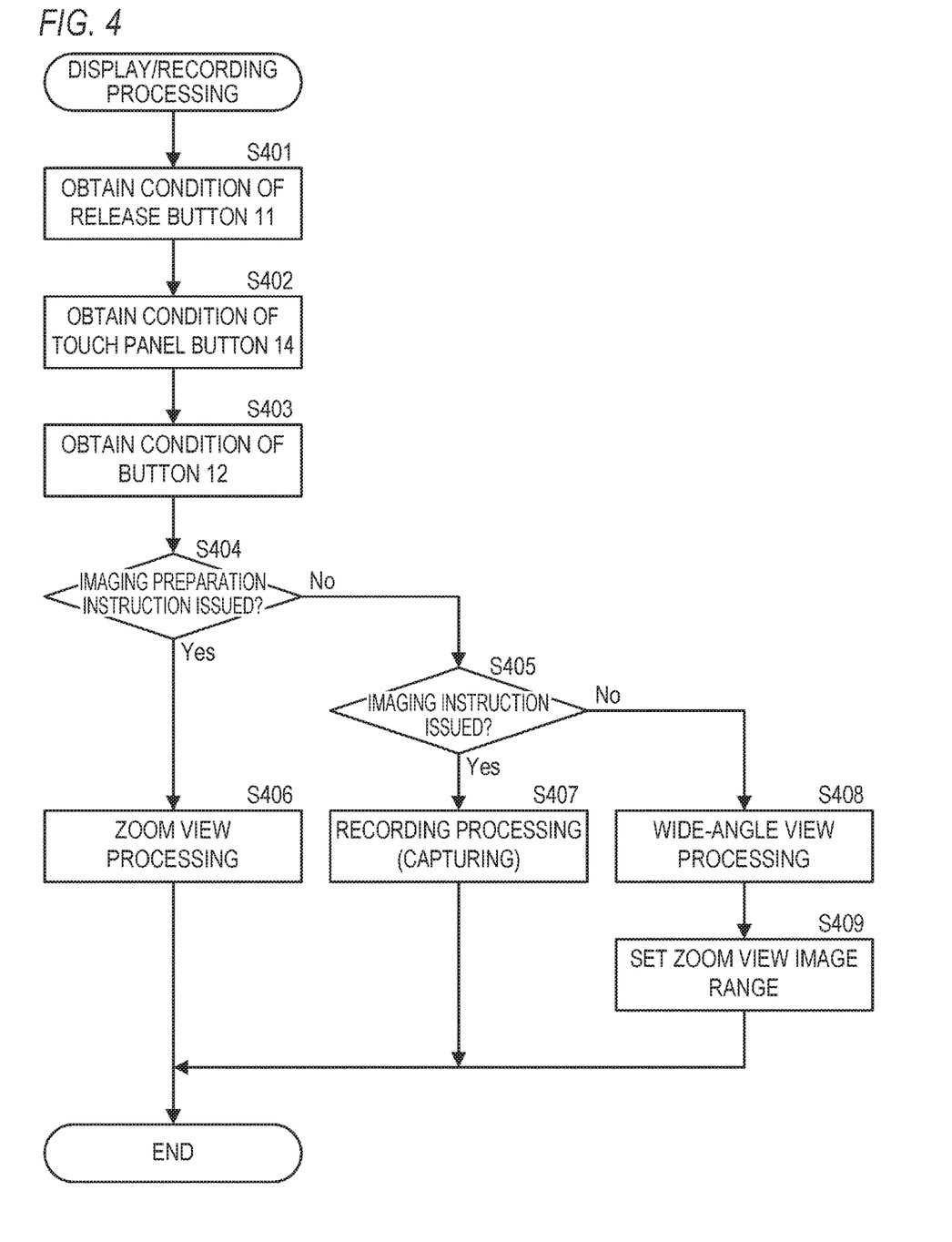
FIG. 4 is a flowchart of display/recording processing executed by the camera control unit 120.

In S307, the camera control unit 120 executes display/recording processing. FIG. 4 is a flowchart showing the display/recording processing.

In S401, the camera control unit 120 obtains an operating condition of the release button 11 and records the obtained operating condition in the RAM 160. The RAM 160 stores operating conditions of the release button 11 corresponding to at least two periods in the form of array data. In so doing, variation in the operating condition of the release button 11 can be detected. The operating condition of the release button 11 includes three conditions, namely a non-pressed condition in which the release button 11 is not pressed, a half-pressed condition in which the release button 11 is half-pressed, and a fully pressed condition in which the release button 11 is fully pressed. The camera control unit 120 updates the array data relating to the release button 11 every time S401 is executed.

In S402, the camera control unit 120 obtains an operating condition of the touch panel button 14 and records the obtained operating condition in the RAM 160. The RAM 160 stores operating conditions of the touch panel button 14 corresponding to at least two periods in the form of array data. In so doing, variation in the operating condition of the touch panel button 14 can be detected. The operating condition of the touch panel button 14 includes two conditions, namely a touched condition in which the touch panel button 14 is touched and a non-touched condition in which the touch panel button 14 is not touched. The camera control unit 120 updates the array data relating to the touch panel button 14 every time S402 is executed.

In S403, the camera control unit 120 obtains an operating condition of the button 12 and records the obtained operating condition in the RAM 160. The RAM 160 stores operating conditions of the button 12 corresponding to at least two periods in the form of array data. In so doing, variation in the operating condition of the button 12 can be detected. The operating condition of the button 12 includes two conditions, namely a pressed condition in which the button 12 is pressed and a non-pressed condition in which the button 12 is not pressed. The camera control unit 120 updates the array data relating to the button 12 every time S403 is executed.

In S404, the camera control unit 120 determines whether or not an imaging preparation instruction has been issued on the basis of the operating conditions obtained in S401 to S403. More specifically, when the operating condition of the release button 11 is the half-pressed condition, the camera control unit 120 determines that an imaging preparation instruction has been issued, and advances the processing to S406. Similarly, when the operating condition of the touch panel button 14 is the touched condition or the operating condition of the button 12 is the pressed condition, the camera control unit 120 determines that an imaging preparation instruction has been issued, and advances the processing to S406. The above-described method for the imaging preparation instruction is only an example, and the imaging preparation instruction may be issued by using only one operation member, or the imaging preparation instruction may be issue by using another operation member. In all other cases, the camera control unit 120 determines that an imaging preparation instruction has not been issued, and advances the processing to S405.

In S405, the camera control unit 120 determines whether or not an imaging instruction has been issued on the basis of the operating conditions obtained in S401 to S403. More specifically, when the operating condition of the release button 11 has shifted from the half-pressed condition to the fully pressed condition, the camera control unit 120 determines that an imaging instruction has been issued, and advances the processing to S407. Similarly, when the operating condition of the touch panel button 14 has shifted from the touched condition to the non-touched condition or the operating condition of the button 12 has shifted from the pressed condition to the non-pressed condition, the camera control unit 120 determines that an imaging instruction has been issued, and advances the processing to S407. The above-described method for the imaging instruction is only an example, and the imaging instruction may be issued by using only one operation member, or the imaging instruction may be issue by using another operation member. In all other cases, the camera control unit 120 determines that neither an imaging instruction nor an imaging preparation instruction has been issued, and advances the processing to S408.

In S406, the camera control unit 120 executes zoom view processing and issues an imaging preparation instruction (an instruction to execute imaging preparation processing). In response to the imaging preparation instruction, at least one of the following processes is executed: autofocus (AF) processing; aperture adjustment by the aperture control unit 105, which corresponds to exposure setting (automatic exposure setting); exposure time (shutter speed) setting by the shutter control unit, which is executed during imaging in S407; white balance adjustment; and gain adjustment by the gain control unit 103. In other words, the imaging preparation instruction is an instruction to execute at least one of the above processes. The camera control unit 120 then terminates the display/recording processing. During the zoom view processing, the camera control unit 120 controls the processing of the GPU 142 and so on such that a zoom view image obtained by transforming a part of the range of the VR image picked-up by the imaging devices 102, 112 so that the corresponding part is magnified is rendered in the VRAM 143 and displayed on the display unit 141. A zoom view image is a type of live view image that is sequentially updated. An example of a zoom view display will be described below using FIG. 5D.

In S407, the camera control unit 120 executes recording processing. The camera control unit 120 then terminates the processing shown in FIG. 4. In the recording processing, the camera control unit 120 executes control to record the picked-up VR image in the storage medium 131. The recording processing may also be referred to as imaging. When a moving image recording mode is set, the camera control unit 120 executes recording processing to start recording the moving image (a VR moving image or the like). When picking-up a live view image, the time that can be spent on a single imaging operation is limited, and therefore the exposure value may be smaller than the exposure value set during the exposure setting processing. Further, picking-up may be performed at a comparatively low resolution (pixel count) when picking-up a live view image. During the recording processing, picking-up is performed at the exposure value set during the exposure setting processing and a higher resolution than the resolution used to picking-up a live view image. More specifically, after the zoom view image displayed in S406 has been checked, an imaging instruction is issued, whereupon the recording processing of S407 is executed.

In S408, the camera control unit 120 executes wide-angle view processing. During the wide-angle view processing, the camera control unit 120 controls the processing of the GPU 142 and so on such that a wide-angle view image constituted by at least a part of the range of the picked-up VR image is rendered in the VRAM 143 and displayed on the display unit 141. A wide-angle view image is a type of live view image. An example of a wide-angle view display will be described below using FIGS. 5A and 5B. The range of a zoom view image is narrower, or smaller, than the range of a wide-angle view image. In other words, a zoom view image displays a portion of the wide-angle view image which has been magnified and undergone distortion correction, or transformation (deforming). In S409, the camera control unit 120 sets the range of the zoom view image in response to a display range selection instruction which can be instructed by the touch panel 13. The camera control unit 120 then terminates the display/recording processing.

FIGS. 5A to 5D show examples of displays according to this embodiment. When a user operation for issuing an imaging preparation instruction or an imaging instruction has not been performed, a wide-angle image is preferably displayed so that the photographer can check a wide range on the periphery thereof. According to this embodiment, in this case, a fish-eye image 501 shown in FIG. 5A, which is picked-up by the imaging device 102, or a fish-eye image 503 shown in FIG. 5B, which is picked-up by the imaging device 112, is displayed as a wide-angle view image in response to the wide-angle view processing of S408.

Figure 5A:
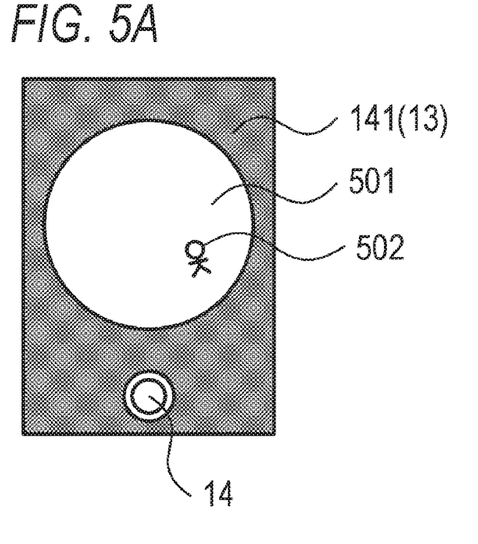
FIGS. 5A to 5D show examples of displays on a display unit 141.
Figure 5B:
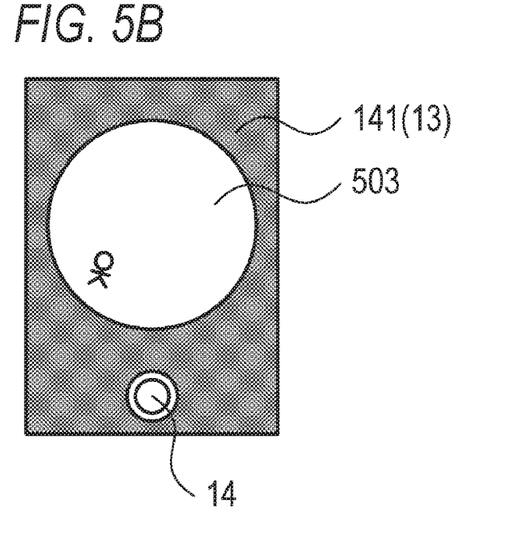
Figure 5C:
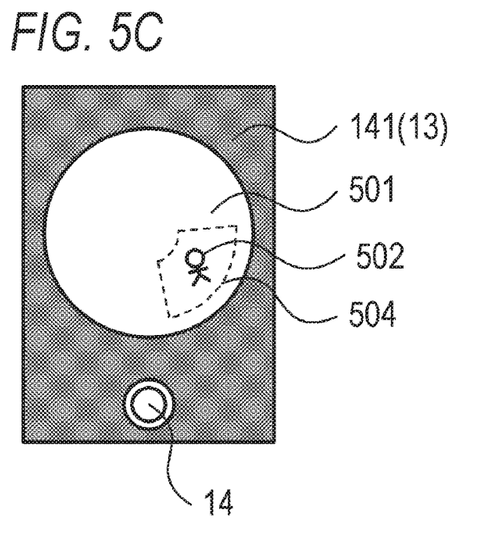

An object 502 is picked-up in the fish-eye image 501 of FIG. 5A. When the photographer touches the vicinity of the object 502, the touch panel 13 outputs coordinate information corresponding to the touched position to the camera control unit 120. On the basis of the coordinate information from the touch panel 13, the camera control unit 120 recognizes a range 504 (FIG. 5C) including the touched position as a range of a zoom view image. As shown in FIG. 5C, the range 504 is a range that extends radially from a position within a VR image corresponding to an optical axis of the lens 101, or in other words a central position of the fish-eye image 501.

Figure 5D:
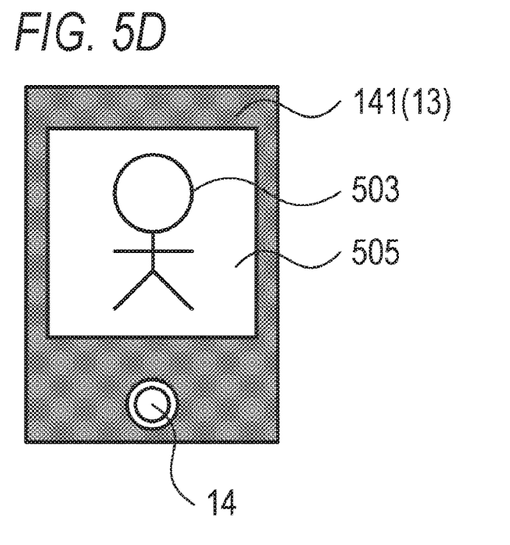

When a user operation for issuing an imaging preparation instruction is performed from the condition shown in FIG. 5C, by the zoom processing of S406, the display on the display unit 141 is switched from display of the fish-eye image 501 to display of a zoom view image 505 obtained by transforming (deforming) and magnifying the range 504. More specifically, the GPU 142 generates the zoom view image 505 in response to an instruction from the camera control unit 120 by extracting the range 504 from the fish-eye image 501 and implementing magnification processing and distortion correction on the image of the range 504, and renders the generated zoom view image 505 in the VRAM 143. As a result, the image rendered in the VRAM 143 is updated from the fish-eye image 501 to the zoom view image 505, and the display on the display unit 141 is switched from display of the fish-eye image 501 to display of the zoom view image 505.

The camera control unit 120 determines the intensity of the magnification processing and distortion correction used to obtain the zoom view image 505 on the basis of a distance between the central position of the fish-eye image 501 and the position of the range 504. The GPU 142 then executes magnification processing and distortion correction at the intensity determined by the camera control unit 120. For example, the camera control unit 120 determines the intensity of the distortion correction to be lower as the distance decreases and higher as the distance increases. In a case where the distance does not exceed a threshold, the camera control unit 120 executes control such that the distortion correction is either omitted or implemented at an intensity ensuring that the distortion of the VR image is not varied. When distortion correction is implemented at an intensity at which the distortion of the VR image is varied, the zoom view image 505 is obtained with substantially no distortion in a central portion thereof. Here, distortion refers to distortion with respect to a real image of the object.

The zoom view image 505 is displayed continuously while the user operation for issuing an imaging preparation instruction has been performed. When the user operation for issuing an imaging preparation instruction is terminated, the camera control unit 120 executes control to return the display on the display unit 141 from display of the zoom view image 505 to display of the fish-eye image 501 or the fish-eye image 503.

According to this embodiment, as described above, by displaying a wide-angle image such as a fish-eye image before the user operation for issuing an imaging preparation instruction is performed, a wide range on the periphery of the camera 100 can be checked. Then, by switching to a zoom view display in response to the user operation for issuing an imaging preparation instruction, a part of the fish-eye image can be checked in detail. More specifically, while the wide-angle image is displayed, the photographer can specify a target object by performing a touch operation, and in response to the user operation for issuing an imaging preparation instruction, the display is switched to a zoom view display of the target object. As a result, the target object can be checked in detail. Hence, for example, conditions on the periphery of the camera 100 can be checked roughly from the wide-angle view display before issuing the imaging preparation instruction, and by issuing the imaging preparation instruction, the facial expression on the magnified target object can be checked from the zoom view display. Then, at the moment the target object smiles, an image of the target object can be captured. According to this embodiment, therefore, the photographer can check the image more favorably, and as a result, the photographer can execute imaging at an appropriate timing, without missing a photo opportunity.

Note that although a preferred embodiment of the present invention was described above, the present invention is of course not limited to this embodiment, and may be subjected to various modifications and amendments within the scope of the spirit thereof. Various modified examples to be described below may be combined with the above embodiment as appropriate.

For example, in the example described above, the camera 100 is configured to include two imaging systems, but the present invention may also be applied to a camera including one imaging system or three or more imaging systems.

Figure 6A:
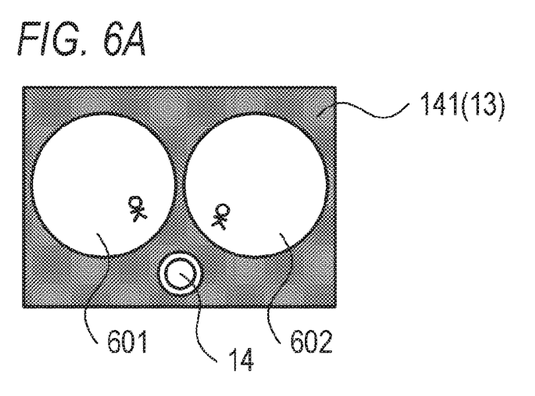
FIGS. 6A to 6C show other examples of displays on the display unit 141.
Figure 6B:
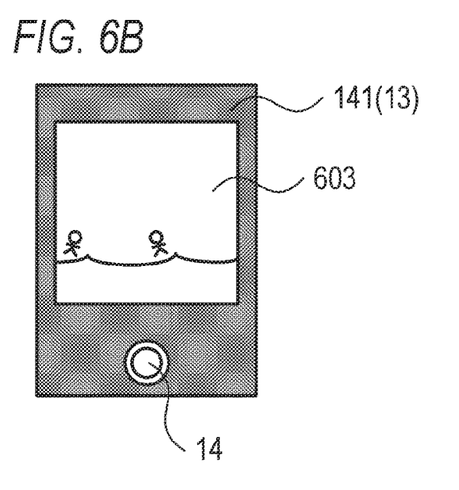
Figure 6C:
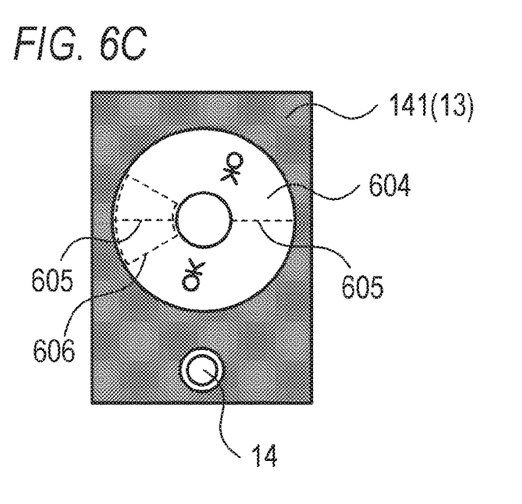

Further, in the example described above, a part of the VR image (i.e. one of the fish-eye images) is displayed without being modified during wide-angle view display, but the present invention is not limited thereto, and instead, under the control of the camera control unit 120, a transformed image or the entire range of the VR image may be displayed as the wide-angle view display. As shown in FIG. 6A, for example, two fish-eye images 601, 602 picked-up respectively by the two imaging devices 102, 112 may both be displayed as the wide-angle view display. As shown in FIG. 6B, a panorama image 603 corresponding to the entire range of the VR image may also be displayed as the wide-angle view display. As shown in FIG. 6C, a dome master image 604 corresponding to the entire range of the VR image may also be displayed as the wide-angle view display. Images in other formats may also be displayed as the wide-angle view display.

The panorama image 603 is obtained by geometrically transforming each part of the fish-eye images 601, 602 into peripheral parts and central parts so as to expand and combine the fish-eye images 601, 602. As is evident from FIG. 6B, the panorama image 603 is a rectangular image obtained by geometrically transforming and thereby combining the fish-eye images 601, 602. The dome master image 604 is likewise obtained by geometrically transforming and thereby combining the fish-eye images 601, 602. The dome master image 604 shows the object as if viewed from the sky above the object. An upper half of the dome master image 604 corresponds to the fish-eye image 601, and a lower half of the dome master image 604 corresponds to the fish-eye image 602. These geometrical transformations can be realized using predetermined information (a table or a function) representing a correspondence relationship between image coordinates prior to the transformation and image coordinates following the transformation.

Furthermore, the VR image recorded by the recording processing (imaging) may be a fish-eye image, a panorama image, a dome master image, or an image in another format.

Moreover, in the example described above, the range of the zoom view image is determined in accordance with a touch operation, but the range of the zoom view image may be determined by another method. For example, the camera control unit 120 may automatically detect a predetermined object (a person, a face, a vehicle, a building, a plant, or the like) from the VR image (an omnidirectional image) and automatically set a part in which the predetermined object exists as the range of the zoom view image. The predetermined object can be detected using a well-known image recognition function. Further, when a plurality of objects are detected, an object that is to serve as a main object may be selected automatically, and the range of the zoom view image may be determined so as to include the selected main object. The main object may be determined by a method of applying weightings, for example, such that a part having a high contrast, a face, a part of the captured image having a large size, a part close to the camera 100, the face of a person registered in the camera 100 (a face detected by personal authentication), or the like is prioritized. On a VR image (a panorama image or a dome master image) obtained by combining a plurality of images, boundaries exist between the plurality of images. Dotted lines 605 in FIG. 6C denote boundaries between the fish-eye image 601 and the fish-eye image 602. The camera control unit 120 may automatically detect the boundaries from the VR image and automatically determine a part (a range 606 in FIG. 6C, for example) including at least a part of the boundaries as the range of the zoom view image. The camera 100 may be provided with a plurality of operating modes having different methods for determining the range of the zoom view image (methods for obtaining the zoom view image).

Here, a plurality of predetermined objects may exist on the VR image. In a configuration where parts in which the predetermined objects exist are subjected to zoom view display, the camera control unit 120 may execute control to display a single zoom view image corresponding to one of the plurality of predetermined objects as the zoom view display, but does not have to execute this control. The camera control unit 120 may execute control for displaying a plurality of zoom view images corresponding respectively to the plurality of predetermined objects in sequence on the display unit 141 as zoom view display control. During this control, the camera control unit 120 may switch the displayed zoom view image between the plurality of zoom view images either automatically or in response to a user operation.

Furthermore, in the example described above, wide-angle view display is switched to zoom view display in response to the user operation for issuing an imaging preparation instruction, but the present invention is not limited thereto. Instead, under the control of the camera control unit 120, zoom view display may be implemented until the user operation for issuing an imaging preparation instruction is performed, and in response to the user operation for issuing an imaging preparation instruction, zoom view display may be switched to wide-angle view display. Hence, for example, a video seen in a specific direction from the camera 100, which has been magnified by being subjected to zoom view display but is not distorted and does not appear unnatural, can be checked before issuing the imaging preparation instruction. Then, when the imaging preparation instruction is issued, the display is switched to wide-angle view display, and as a result, an imaging operation can be performed the moment an event suited to photography (the moment a large number of launched fireworks burst open, for example) occurs on the periphery of the camera 100.

Figure 7:
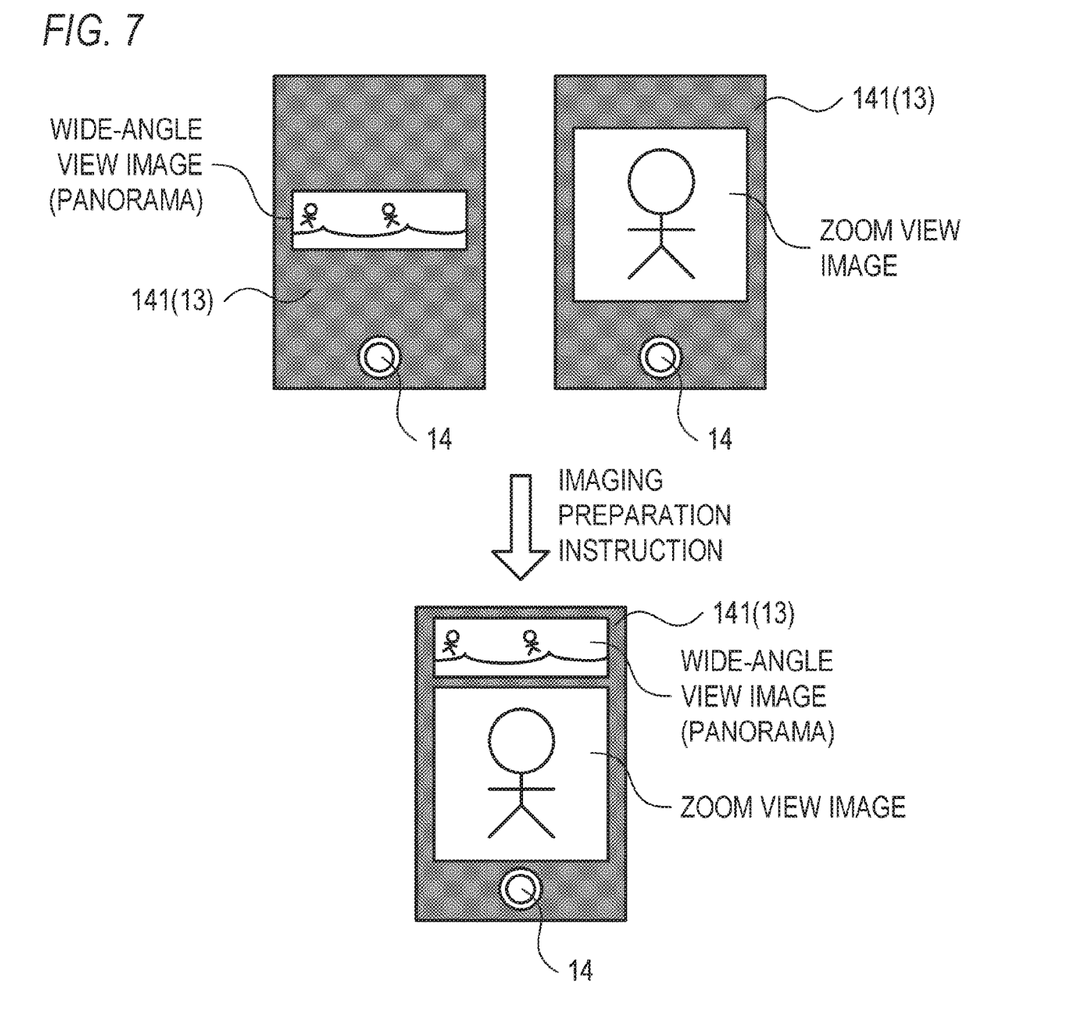
FIG. 7 shows a further example of a display on the display unit 141.

Moreover, zoom view display and wide-angle view display need not be switched. As shown in FIG. 7, before the imaging preparation instruction is issued (in an imaging standby condition), one of a zoom view image and a wide-angle view image is displayed. Then, in response to the user operation for issuing an imaging preparation instruction, display of one of the zoom view image and the wide-angle view image is switched to display of both images under the control of the camera control unit 120. When the zoom view image and the wide-angle view image are both displayed, the photographer, by viewing the wide-angle view image, can execute imaging without missing the moment an event suited to photography occurs on the periphery of the camera 100. Further, by viewing the zoom view image, the photographer can execute imaging without missing a photo opportunity occurring within a narrow range, such as a change in facial expression. Note that in the imaging standby condition (while the imaging preparation instruction is issued), one of the zoom view image and the wide-angle view image is displayed, and not both. The reason for this is that when both images are displayed in the imaging standby condition, an image processing load increases, leading to an increase in power consumption (in other words, to save energy).

Furthermore, in the imaging standby condition and during the period in which the imaging preparation instruction is issued, display of the zoom view image and the wide-angle view image may be switched automatically in accordance with an operating mode. For example, when a person imaging mode (a first operating mode) which is one of a plurality of imaging modes is set, the wide-angle view image is displayed in the imaging standby condition, and the display is switched to either the zoom view image or both images in response to the imaging preparation instruction. In so doing, as described above, the photographer can execute imaging without missing a small photo opportunity occurring within a narrow range, such as a change in facial expression. Meanwhile, in a firework imaging mode, a sport imaging mode, or a landscape imaging mode (a second operating mode) which is one of the plurality of imaging modes, the zoom view image is displayed in the imaging standby condition, and the display is switched to either the wide-angle view image or both images in response to the imaging preparation instruction. In so doing, as described above, the photographer can execute imaging without missing an event occurring in a wide range on the periphery of the camera or an event occurring in an unpredictable position.

Moreover, the various types of control described above as being executed by the camera control unit 120 may be implemented using a single piece of hardware, or overall control of the apparatus may be realized by apportioning the processing to a plurality of pieces of hardware.

Furthermore, in the above embodiment, a case in which the present invention is applied to the camera 100 was described as an example, but the present invention is not limited to this example, and may be applied to any electronic device capable of executing control to display at least a part of a VR image. More specifically, the present invention may be applied to a personal computer, a PDA, a mobile telephone terminal, a portable image viewer, a printer device having a display, a digital photo frame, and so on. The present invention may also be applied to a music player, a game device, an electronic book reader, a tablet terminal, a smartphone, a projection device, a household appliance or in-vehicle device having a display, and so on.

Furthermore, the present invention is not limited to an imaging apparatus main body, and may also be applied to a control apparatus that controls an imaging apparatus (including a network camera) remotely by communicating with the imaging apparatus by wired or wireless communication. Examples of devices for controlling an imaging apparatus remotely include a smartphone, a tablet PC, a desktop PC, and so on. The imaging apparatus can be controlled remotely by transmitting commands to implement various operations and settings from the control apparatus side to the imaging apparatus on the basis of operations performed on the control apparatus side and processing executed on the control apparatus side. Moreover, a live view image captured by the imaging apparatus can be received by wired or wireless communication and displayed on the control apparatus side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-127166, filed on Jun. 29, 2017, which is hereby incorporated by reference herein in its entirety.

What is claimed is:

1. An imaging control apparatus comprising a memory and at least one processor executing computer instructions stored in the memory, causing the processor to function as:
a control unit configured to receive a first user operation and configured to:
in a case where the first user operation is not received, execute control to output an image signal which is to be displayed on a display unit, the image signal being one of:
a first image corresponding to a first range of a live virtual reality (VR) image which is a live view image received from an imaging unit; and
a second image corresponding to a second range of the live VR image which is magnified relative to the live VR image, the second range being a smaller range than the first range, and
in a case where the first user operation is received:
execute control to output an image signal which is to change the image displayed on the display unit from one of the first image and the second image to the other of the first image and the second image, or to both the first image and the second image; and
issue a preparation instruction to execute imaging preparation processing,
wherein the live VR image includes distortion with respect to a real image of an object,
the first image is an image obtained without performing a specific correction processing for correcting the distortion on the live VR image, and
the second image is an image obtained by performing the specific correction processing on the live VR image.

2. The imaging control apparatus according to claim 1, wherein the control unit is further configured to execute control to output the image signal as the first image to be displayed on the display unit in a case where the first user operation is not received.

3. The imaging control apparatus according to claim 1, wherein the control unit is further configured to execute control to output the image signal as the second image to be displayed on the display unit in a case where the first user operation is not received.

4. The imaging control apparatus according to claim 1, wherein the control unit is further configured to:
execute control to output the image signal as the first image to be displayed on the display unit in a case where a first operating mode is set and the first user operation is not received, and
execute control to output the image signal as the second image to be displayed on the display unit in a case where a second operating mode is set and the first user operation is not received.

5. The imaging control apparatus according to claim 1, wherein the control unit is further configured to execute control to change the image signal which is to be output for display on the display unit to the other of the first image and the second image in response to receipt of the first user operation.

6. The imaging control apparatus according to claim 1, wherein the control unit is further configured to execute control to change the image signal which is to be output for display on the display unit to both the first image and the second image in response to receipt of the first user operation.

7. The imaging control apparatus according to claim 1, wherein the control unit is further configured to execute control to return the image signal which is output for display on the display unit to one of the first image and the second image in response to termination of receipt of the first user operation.

8. The imaging control apparatus according to claim 1, wherein the first range is an entire range of the live VR image.

9. The imaging control apparatus according to claim 1, wherein the first user operation is received from an operation unit in the case that a user has performed a first operation on the operation unit, and
the control unit is further configured to issue an instruction which is to instruct the imaging unit to capture a VR image in response to receipt of a second user operation performed on the operation unit by a user.

10. The imaging control apparatus according to claim 9, wherein the first user operation is an operation to half-press a shutter button, and the second user operation is an operation to fully press the shutter button.

11. The imaging control apparatus according to claim 9, further comprising a touch panel as the operation unit which detects a touch operation performed on the touch panel,
wherein the first user operation is a first touch operation performed on a particular display item displayed on the display surface, and the second user operation is a second touch operation performed on the particular display item.

12. The imaging control apparatus according to claim 11, wherein the first touch operation is an operation to start a contact on the touch panel, and the second touch operation is an operation to release contact from the touch panel following the first touch operation.

13. The imaging control apparatus according to claim 1, further comprising an image processor which executes the specific correction processing.

14. The imaging control apparatus according to claim 13, wherein the specific correction processing is a correction processing at an intensity based on a distance between a position on the live VR image corresponding to an optical axis of a lens used during imaging and a position on the live VR image corresponding to the second image.

15. The imaging control apparatus according to claim 14, wherein, in a case where the distance does not exceed a threshold, the image processor either omits the specific correction processing or executes the specific correction processing at an intensity ensuring that the distortion of the live VR image is not varied.

16. The imaging control apparatus according to claim 1, further comprising an imaging unit which includes a plurality of imaging devices for respectively picking-up a plurality of images constituting the live VR image.

17. The imaging control apparatus according to claim 16, wherein the live VR image is a single image obtained by combining the plurality of images, and
in a case where the first user operation has been performed, the control unit executes control to output an image signal which is to be displayed on the display unit, the second image including a boundary between the plurality of images.

18. The imaging control apparatus according to claim 1, further comprising a touch panel which detects a touch operation performed on the touch panel,
wherein, in a case where a touch is performed on the first image displayed on the display unit, and then the first user operation is performed, the control unit is configured to execute control to output an image signal which is to be displayed on the display unit, the second image corresponding to the touched position on the first image.

19. The imaging control apparatus according to claim 1, wherein, in a case where the first user operation has been performed, the control unit is configured to execute control to output an image signal which is to be displayed on the display unit, the second image corresponding to a part of the first image in which a predetermined object exists.

20. The imaging control apparatus according to claim 19, wherein, in a case where a plurality of predetermined objects exist on the live VR image and the first user operation has been performed, the control unit is configured to execute control to output an image signal so that a plurality of second images corresponding respectively to the plurality of predetermined objects in a sequence are to be displayed on the display unit.

21. The imaging control apparatus according to claim 20, wherein, during the control for displaying the plurality of second images in sequence on the display unit, the control unit changes, in response to a second user operation, the image signal which is output so that the second image which is to be displayed on the display unit changes between the plurality of second images.

22. The imaging control apparatus according to claim 1, wherein the preparation instruction is an instruction to execute at least one of autofocus, exposure setting, aperture adjustment, shutter speed setting, white balance adjustment, and gain adjustment as imaging preparation processing, in response to receipt of the first user operation.

23. A control method for an imaging control apparatus, comprising:
receiving a first user operation;
in a case where the first user operation has not been performed, executing control to output an image signal which is to be displayed on a display unit, the image signal being one of:
a first image corresponding to a first range of a live virtual reality (VR) image which is a live view image picked-up by the imaging unit; and
a second image corresponding to a second range of the live VR image which is magnified relative to the live VR image, the second range being a smaller range than the first range; and
in a case where the first user operation is received:
executing control to output an image signal which is to change the image displayed on the display unit from one of the first image and the second image to the other of the first image and the second image, or to both the first image and the second image; and
issuing a preparation instruction to execute imaging preparation processing,
wherein the live VR image includes distortion with respect to a real image of an object,
the first image is an image obtained without performing a specific correction processing for correcting the distortion on the live VR image, and
the second image is an image obtained by performing the specific correction processing on the live VR image.

24. A non-transitory computer readable medium that stores a program, wherein the program causes a computer to execute:
receiving a first user operation;
in a case where the first user operation has not been performed, executing control to output an image signal which is to be displayed on a display unit, the image signal being one of:
a first image corresponding to a first range of a live virtual reality (VR) image which is a live view image picked-up by the imaging unit; and
a second image corresponding to a second range of the live VR image which is magnified relative to the live VR image, the second range being a smaller range than the first range; and
in a case where the first user operation is received:
executing control to output an image signal which is to change the image displayed on the display unit from one of the first image and the second image to the other of the first image and the second image, or to both the first image and the second image; and
issuing a preparation instruction to execute imaging preparation processing,
wherein the live VR image includes distortion with respect to a real image of an object,
the first image is an image obtained without performing a specific correction processing for correcting the distortion on the live VR image, and
the second image is an image obtained by performing the specific correction processing on the live VR image.

* * * * *